United States Patent [19]

Brucker

[11] Patent Number: 5,033,411
[45] Date of Patent: * Jul. 23, 1991

[54] BIRD-FEEDER

[75] Inventor: Robert J. Brucker, Bernardsville, N.J.

[73] Assignee: Seal Spout Corporation, Liberty Corner, N.J.

[ * ] Notice: The portion of the term of this patent subsequent to Sep. 11, 2007 has been disclaimed.

[21] Appl. No.: 385,728

[22] Filed: Jul. 26, 1989

Related U.S. Application Data

[63] Continuation-in-part of Ser. No. 256,742, Oct. 12, 1988, Pat. No. 4,955,319.

[51] Int. Cl.⁵ .......................................... A01K 31/014
[52] U.S. Cl. ................................ 119/52.1; 119/57.8; 119/61
[58] Field of Search .................. 119/52.1, 52.2, 57.8, 119/61

[56] References Cited

U.S. PATENT DOCUMENTS

| | | | |
|---|---|---|---|
| D. 115,321 | 6/1939 | Pueschel | 119/52.2 |
| 1,279,478 | 9/1918 | Stofer | 206/124 |
| 1,378,533 | 5/1921 | Fitzgerald | 119/52.1 |
| 2,475,207 | 7/1949 | Smith | 119/52.2 |
| 2,556,661 | 6/1951 | Rendall et al. | 119/52.1 |
| 2,699,752 | 1/1955 | Reyes | 119/52.2 |
| 2,943,600 | 7/1960 | Rosoff | 119/52.1 |
| 3,136,296 | 6/1964 | Luin | 119/52.2 |
| 3,354,868 | 11/1967 | Woodling | 119/52.2 |
| 4,034,715 | 7/1977 | Arner | 119/51.5 |
| 4,204,500 | 5/1980 | Podjan | 119/51.5 |
| 4,233,941 | 11/1980 | Webster | 119/52.2 |
| 4,242,984 | 1/1981 | Smith | 119/52.2 |
| 4,246,869 | 1/1981 | Tobin, Jr. | 119/52.8 |
| 4,327,669 | 5/1982 | Blasbalg | 119/52.8 |
| 4,574,738 | 3/1986 | Tominaga | 119/52.2 |
| 4,706,851 | 11/1987 | Hegedus et al. | 119/52.2 |
| 4,712,512 | 12/1987 | Schreib et al. | 119/52.2 |
| 4,721,063 | 1/1988 | Atchley | 119/61 |

OTHER PUBLICATIONS

Popular Mechanics, Aug. 1945, p. 112, "Bird Feeders from Gourds".

*Primary Examiner*—Paul J. Hirsch
*Attorney, Agent, or Firm*—Weingram & Zall

[57] ABSTRACT

The present invention relates to a bird feeder which is combined with a container for the bird food. The bird-feed container makes use of a spout, such as may be employed with the common salt dispenser, the spout being mounted for insertion and removal of the "bottom" of the bird food container. The container may take the form of a closed container, such as normally found in the familiar salt dispenser. The bird feeder has a basin which is disposed vertically below the spout. The basin is connected to the bird food container. Flow of bird food from the spout to the basin is stopped automatically by the bird food when the bird food reaches a selected level. A perch in the form of a dowel or stick is passed through holes in the wings of the spout to provide a perch for the feeding bird.

8 Claims, 4 Drawing Sheets

BIRD-FEEDER

CROSS-REFERENCES TO RELATED APPLICATIONS

This application is a continuation-in-part of my earlier filed U.S. patent application Ser. No. 07/256,742 filed Oct. 12, 1988 now U.S. Pat. No. 4,955,319.

BACKGROUND OF THE INVENTION

1. Field of the Invention

The present invention relates to a bird feeder of the type employing a closed container containing bird food with a spout formed at the bottom thereof. In one embodiment, when the container is inverted, the spout forms a food conduit as well as an exit for the food. A pivot-stick is passed through holes in wings of the spout to act as a perch for the bird. A basin unit displays the food and controls the flow of food and forms a perch for the bird. In another embodiment, when the container is inverted, the spout forms a food conduit as well as an exit for the food. A basin unit displays the food and controls the flow of food and forms a perch for the bird.

2. Discussion of the Prior Art

Tobias, U.S. Pat. No. 2,504,282 discloses a collapsible-type feeder having perches formed on the base of the feeder.

Stainbrook, U.S. Pat. No. 3,124,103 features a spout-type bird feeder but the arrangement of this feeder is complicated, requiring multiple moving parts and pivots to provide food to birds of appropriate size and weight.

Early, U.S. Pat. No. 2,775,226 teaches a paperboard feeder container which can be converted into a bird feeder. A trough attachment is provided and the trough attachment forms a bird support and a spout feeding arrangement which can pivotally open and close by wings mounted on the sides of the container.

Kuhn, U.S. Pat. No. 3,179,244 combines a bird feed shipping container with a bird feed arrangement. The bird is provided with a stand which is inserted into the bottom of the container. Food is reached by an aperture formed in the container.

Dornbush, U.S. Pat. No. 3,478,948 teaches a dispensing container having a trough feeding bin.

Webster. U.S. Pat. No. 4,233,941 shows a bird feeder which forms a base supported by cantilevered wings against the feeding container. There is no spout shown in this patent as the bird food is exited to the feeding platform via an aperture in the bottom of the container.

Kersher, U.S. Pat. No. 4,215,652 has a number of feed apertures and bird support bars mounted through a V-shaped feed hopper.

Kilham, U.S. Pat. No. 4,328,765 shows a feeding perch for birds where the perch is mounted on wings extending from a feeder container.

Dehls, U.S. Pat. No. 4,541,362 discloses a bird feeder where the feed station is designed to be selective to birds of a certain size and weight.

SUMMARY OF THE INVENTION

The present invention relates to a bird feeder which is combined with a container for the bird food. The bird food container makes use of a spout, such as may be employed with the common salt dispenser, the spout being mounted for insertion and removal at the "bottom" of the bird food container. A perch in the form of a dowel or stick is passed through holes in the wings of the spout to provide a perch for the feeding bird. The container may take the form of a closed container, such as normally found in the familiar salt dispenser.

In another embodiment, the bird feeder has a basin unit, which displays the food and which controls the food flow and which forms a perch for the feeding bird.

One embodiment uses the bird feeder with the spout right side up. This embodiment has a cover and a bottom connected by three wires. The bottom piece has a rim with a basin or bowl on which the bird can perch and eat. The embodiment provides a spout which is not upside down but is, rather, right-side up so that when the entire container is inverted, opening the spout will allow the bird seed to pour out as the amount of bird seed in the basin or bowl is exhausted by birds eating it. This is preferable for use outdoors.

Another embodiment of the present invention is designed for use indoors and particularly, in cages. This employs a small injection-molded plastic holder device having arms coming off a spine to allow a small cylindrical tube of bird seed to be placed in the holder, again with the spout in the bottom so that the cylindrical cartridge could be held by the arms and then the spout opened permitting the bird seed to fall out to fill the bowl or basin.

A further object of the present invention is to provide a bird food container and bird feeder employing an openable spout and a basin unit, which together provide a perch for a feeding bird and a source for food to flow from the container to a feeding position and a control for the food flow.

A principal object of the present invention is to provide a combined bird feeder and bird feed container.

A further object of the present invention is to provide a bird feed container and bird feeder employing an openable spout which, combined with a dowel or stick, provides a perch for a feeding bird and a source for food to pass from the container to a feeding position.

Another object of the present invention is to provide a device for packaging bird food and for employing same as a bird feeder station, which device is simple and low in cost with relatively few parts.

The above as well as further objects and advantages of the invention will become apparent to those skilled in the art from a review of the accompanying drawings and a review of the details specification.

DETAILED DESCRIPTION OF THE PREFERRED EMBODIMENT

Figure 1:
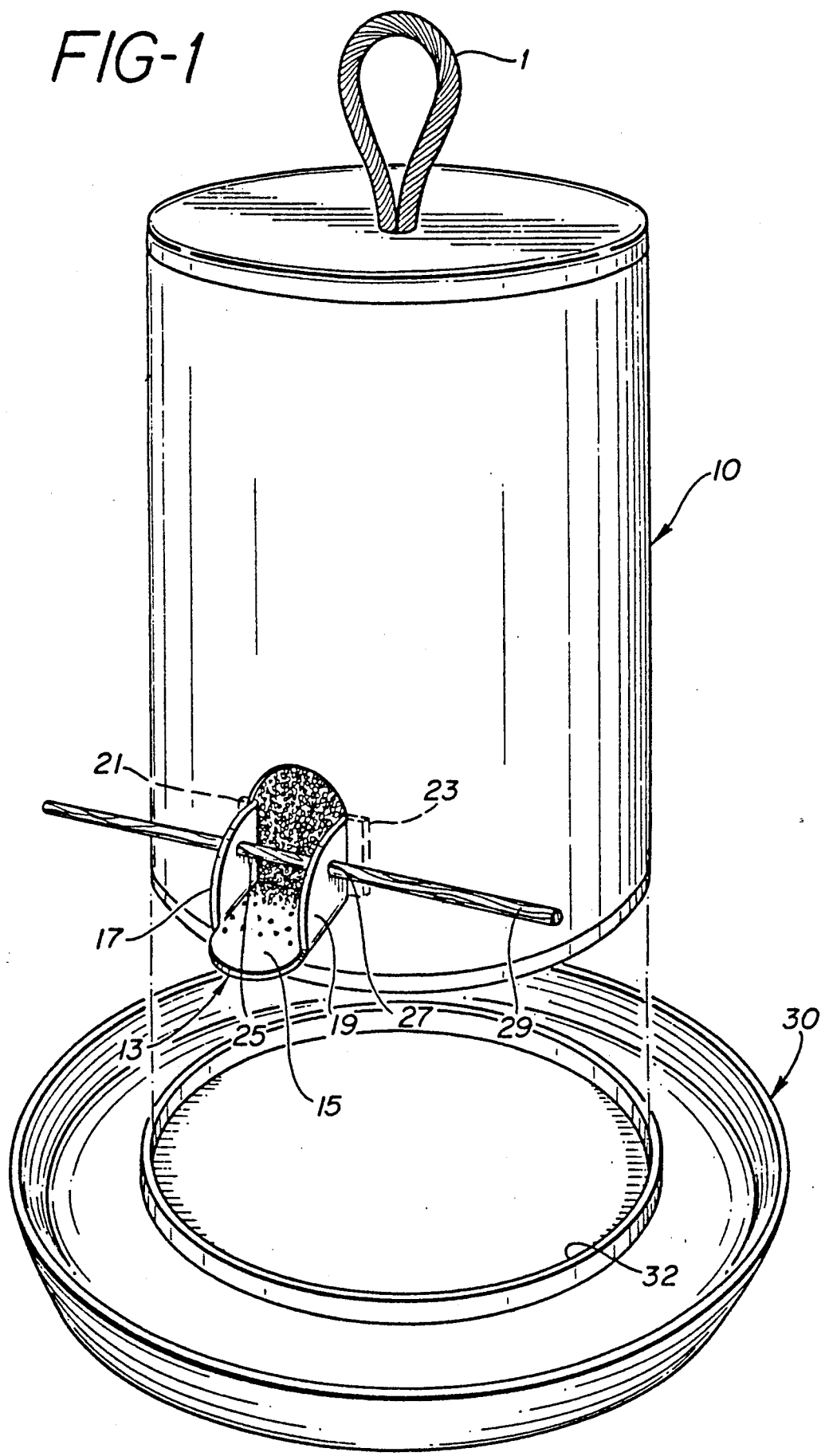
FIG. 1 is a perspective view of one embodiment of the bird feed container and bird feeder of the invention.

In FIG. 1, the bird food container is shown generally at 10 as a cylindrical container having completely closed top and bottom surfaces and an enclosed protective wall in the manner of the well-known containers for salt.

Affixed to the side wall of the container at or near one end thereof is a spout 13. The spout 13 has a feed supporting surface 25 and two wings, 17 and 19, formed thereon. The rearward projections of the wings 17,19 are shown at 21 and 23, respectively. These rearward projections are formed as bent tabs and are designed to cooperate with the interior of the container 10 to prevent the spout from tipping beyond the point where the tabs 21,23 engage the interior wall of the container 10. Also formed in the wings 17,19 are holes 25,27. These holes are designed to interfit with a support perch which may be in the form of a dowel 21. As can now be seen, the spout 13 is "opened" allowing bird food to pass from the container to surface 15 of the spout 13. The perch 29 may be inserted in holes 25,27 to provide a mounting for the perch and a position on the feeder for the birds.

The perch may or may not be employed, however, as desired and the food simply allowed to collect on flat surface 15 of the spout 13 or allowed to spill from the spout 13 to another container 30.

Container 30 may take the form of a circular dish having a raised internal rim 32. The internal rim 32 is formed to interfit and be supported by the bottom of the cylindrical container 10. Thus, the dish 30 may be frictionally or adhesively engaged to the container 10. The dish can be employed to receive bird food in the trough between the internal rim 32 and the exterior rim of the dish 30. The exterior rim also serves as a perch surface for feeding birds. A hook 1 can also be provided to facilitate hanging of the feeder 10.

Figure 2:
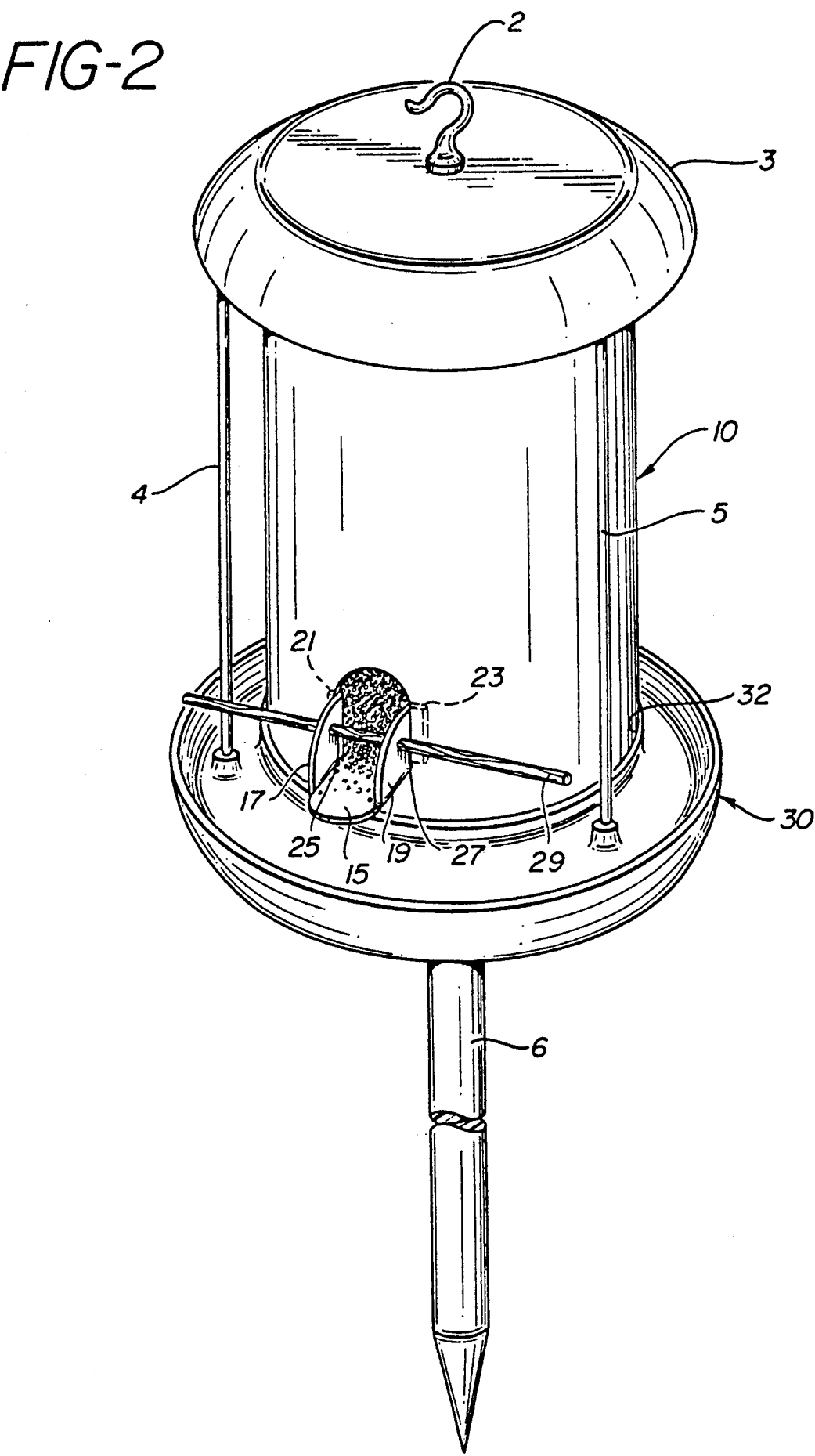
FIG. 2 is a perspective view of another embodiment of my invention.

FIG. 2 shows another embodiment of the bird feeder of my invention. In FIG. 2, like numerals designate like parts in FIG. 1. As can be seen in FIG. 2, dish 30 employs both the internal rim 32 as discussed in connection with FIG. 1, and vertical support bars 4,5. These support bars connect the dish 30 to a top cover 3. Cover 3 may take the same form as dish 30 except that it is employed in an inverted manner so as to provide a "roof" over the feeding positions on perch 29 and within dish 30. A hook 2 can be used to hand the feeder and/or a spike 6 can be used to secure the feeder from below dish 30.

Thus, the feeding package of the present invention combines a feeding station with a container for bird food. However, the feeding portion may be bypassed altogether and food simply poured from the container to another bird feeding location.

Figure 3:
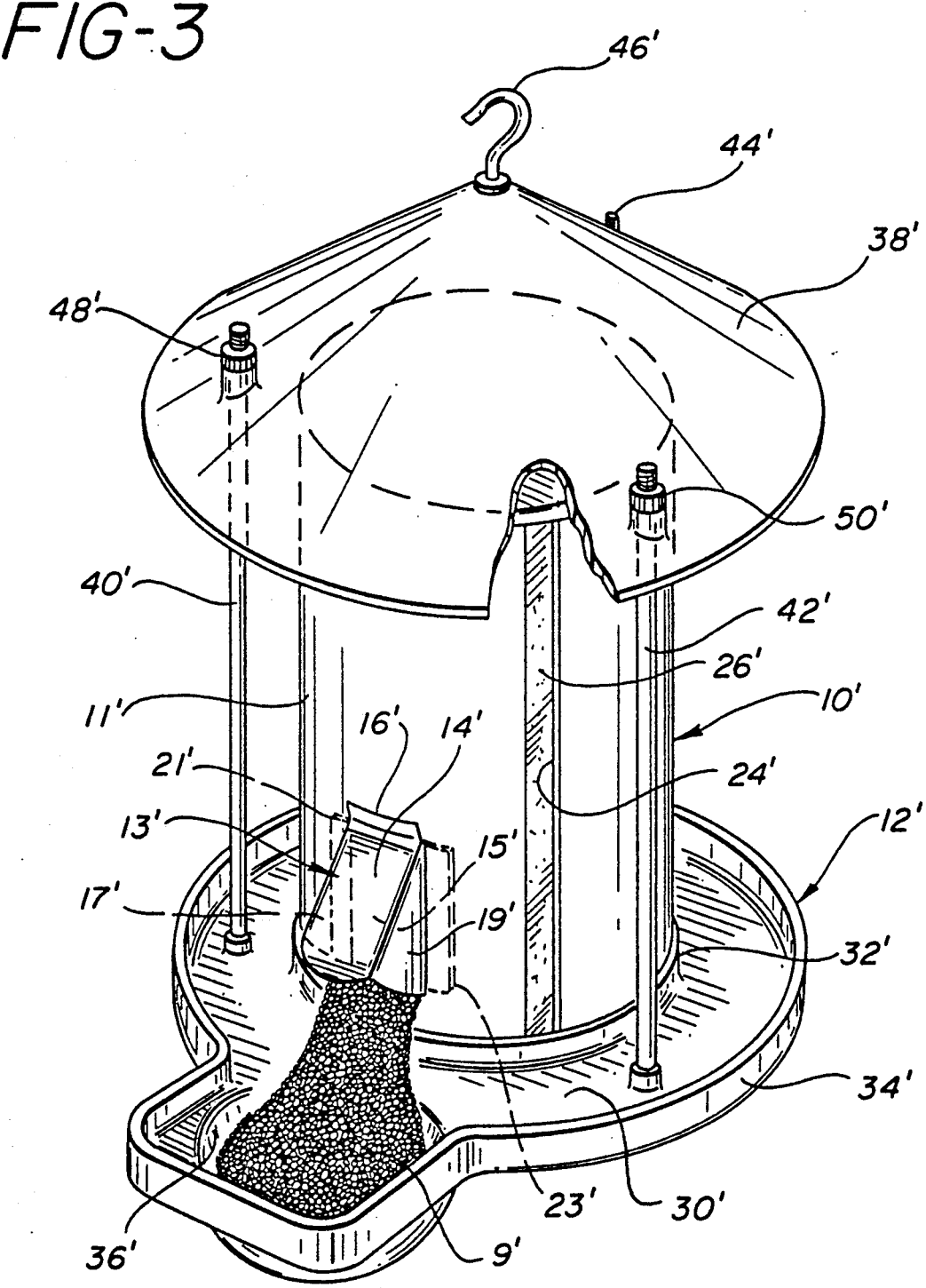
FIG. 3 is a perspective view of another embodiment of the bird food container and bird feeder of the invention.

In FIG. 3, the bird food container is shown generally at 10' and the bird feeder is shown generally at 12'. Container 10' is a cylindrical container having completely closed top and bottom surfaces and an enclosed protective wall 11' in the manner of the well known containers for salt.

Affixed to side wall 11' of the container 10' at or near one end thereof is a spout 13'. The spout 13' has a door 14', which has an inner surface 15' and which has a hinge member 16'. The spout 13' also has two wings, 17' and 19'. The rearward projections of the wings 17',19' are shown at 21' and 23' respectively. These rearward projections 17',19' are formed as bent tabs and are designed to cooperate with the interior of the wall 12' of the container 10' to prevent the spout from tipping beyond the point where the tabs 21',23' engage the interior of the wall 12' of the container 10'. As can now be seen, the spout 13' is "opened" allowing a bird food 9' to pass from the container 10' to bird feeder 12'. Spout 13' is a downwardly projecting, conventional spout.

The container 10' also has a window opening 24' in wall 11'. The window opening 24' has a transparent window sheet 26', which is composed of a transparent material, such as a transparent plastic material. Window sheet 26' permits a view of the interior of wall 12' and the level of the bird food 9', which is disposed inside container 10'.

Bird feeder 12' has a circular dish or platform or walkway 30', which has a raised internal rim 32'. The internal rim 32' is formed to interfit and be connected to the bottom of the cylindrical container 10'. Thus, the dish 30' may be frictionally or adhesively engaged to the container 10'. The dish 30' can also be employed to receive bird food in the trough between the internal rim 32' and the exterior rim 34' of the dish 30'. The exterior rim 34' also serves as a perch surface for feeding birds.

The dish 30' is also supported by a cover or roof 38, which has a conical shape. The dish 30' is suspended from cover 38' by three support wires 40',42',44'. Wires 40',42',44' each has a threaded nut or grip or collar at each end thereof. The wires 40',42' have respective upper threaded nuts 48',50', as shown in FIG. 3. The cover 38' has a hook 46' for supporting cover 38'. The cover 38' supports the wires 40',42',44', which support dish 30', which supports container 10'.

The bird food 9' flows from the container 10' to the basin unit 36'. The bird food 9' is guided by door surface 15' of door 14' and is guided by wings 17',19' in the flow through spout 13'. The bird food 9' is directed into basin unit 36'. When the basin unit 36' has bird food 9' at a selected level, a reaction force from the portion of the bird food 9', which is disposed in the basin unit 36', acts against the gravity force of the falling portion of bird food, thereby stopping the flow of the bird food 9' through the spout 13', thus, the spout 13' and the basin unit 36' act together for directing the flow of the bird food 9' and for stopping the flow of bird food 9' and for forming a perch for a bird. The combination structure of bird food container 10' and bird feeder 12' is very suitable in an outdoor or exterior environment, such as when hung from a tree.

Figure 4:
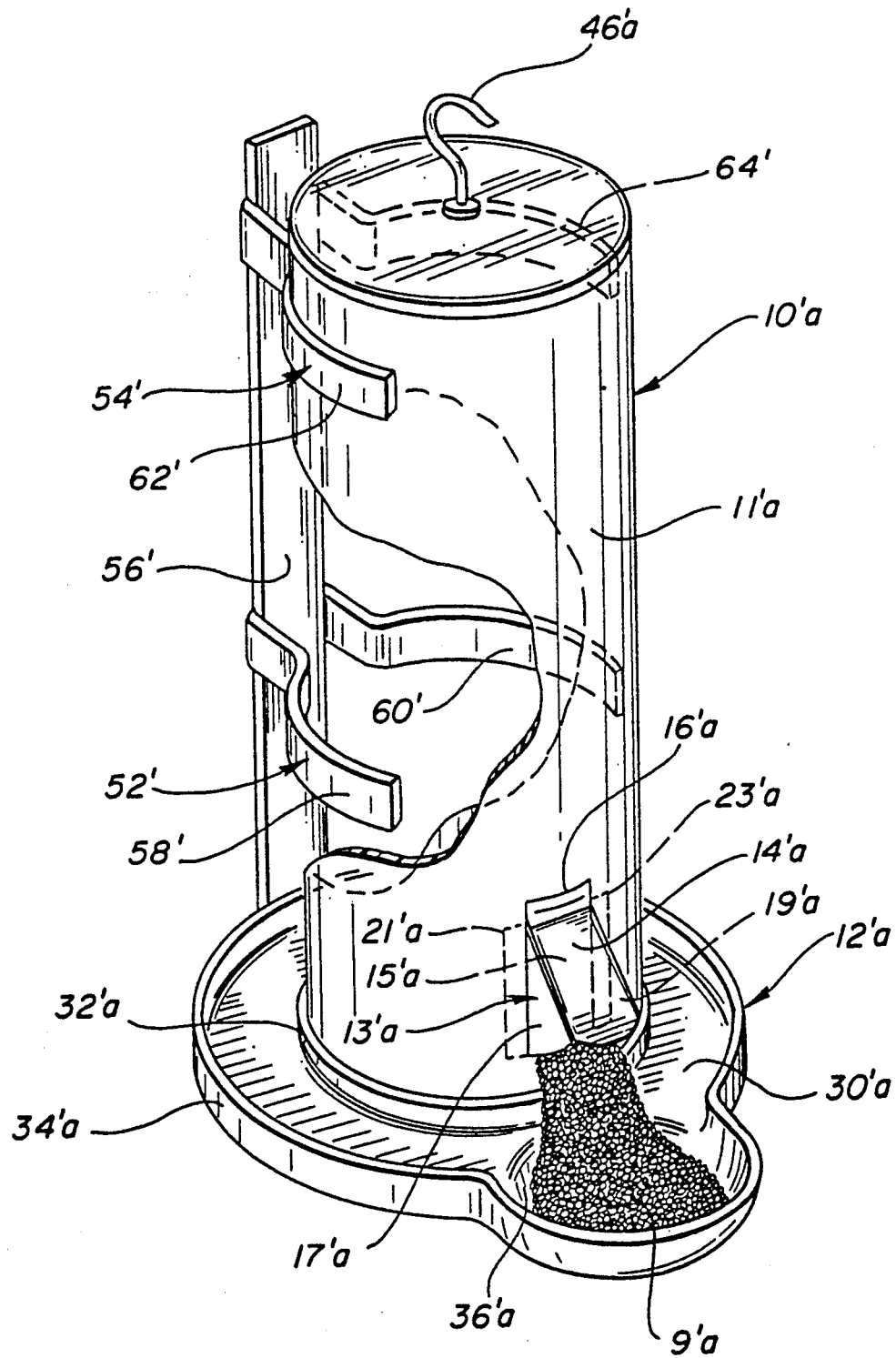
FIG. 4 is a perspective view of another embodiment of my invention.

As shown in FIG. 4, a further embodiment of the invention is provided. Parts of this embodiment in FIG. 4, which are the same as corresponding parts of the embodiment in FIG. 3, have the same numerals, but with a subscript "A" added thereto.

The combination structure of the second embodiment in FIG. 2 includes a bird food container 10'a and a bird feeder unit 12'a.

The container 10'a contains a bird food 9'a. The container 10'a has top and bottom surfaces and an enclosed wall 11'a. Wall 11'a has a spout 13'a which is a downwardly projecting conventional spout. The spout 13'a has a door 14'a, which has an inner door surface 15'a. The door 14'a has a hinge member 16'a. The door 14'a has swings 17'a,19'a, which have respective rearward projections 21'a,23'a.

The bird feeder 12'a, which is a one-piece member, such as an extruded plastic one-piece member, has a dish or platform 30'a. The dish 30'a has an internal rim 32'a and an external rim 34'a. The dish 30'a is joined to or has a basin unit 36'a for displaying the bird food 9'a.

The combination structure of bird food container 10'a and bird feeder 12'a is very suitable in an indoor or interior environment, such as the environment inside a birdcage in a house. The bird feeder 12'a, which supports the bird food container 10'a, can be placed on the floor of a birdcage.

The replacement of a used bird food container, which can be carried on outside of the cage, is done by sliding the used container upwardly away from the top of the bird feeder 12'a. A new container can then be slid downwardly between lower and upper dual-arm clamps 52',54'. Clamps 52',54' are fixedly connected to a vertical post 56', which is fixedly connected to dish 30'a.

Alternately, feeder 12'a can be hung inside the cage using hook 46'a.

Food flow into basin 36'a is urged by a gravity force. Flow stops when basin 36'a is full due to a reaction force acting against the gravity force, in the same fashion as that of the first embodiment.

Clamp 52' has resilient arms 58',60'. Clamp 54' also has resilient arms 62',64'. Arms 58',60' and 62',64' grip the opposite sides of container 10'a for connecting container 10'a to feeder 12'a.

Thus, the bird feeder 12',12'a of the present invention provides a self-operating feeding station with a flow control basin for the bird food. However, the bird feeder 12',12'a may be bypassed altogether and food simply poured from the container 10' to another bird feeding location.

As variations to the foregoing may be made without departing from the spirit or scope thereof, it is intended that the protection afforded Applicant hereunder be in accordance with the accompanying claims. For example, dish 30',30'a can use a continuous support within internal rim 32',32'a for support of container 10',10'a, instead of using a cutout portion which has a connector, such as an adhesive, between internal rim 3240 ,32'a and container 10',10'a.

I claim:
1. A container comprising:
   a body having closed bottom, top and side wall surfaces for containing animal food;
   spout means formed in said sidewalls, said spout means including spout surfaces for directing animal food urged by gravity force in a downward flow;
   basin means that attach to said bottom surface for collecting a portion of the animal food which flows therein from the spout means and coacts with the basin means for stopping the flow when the collected animal food reaches a selected level, said basin means comprising a feeding surface, internal rim means formed on said feeding surface for overfitting said bottom surface and external rim means formed on said feeding surface spaced from said internal rim means.
2. The container of claim 1 including window means disposed in said side walls for viewing the interior of the body and for viewing the animal food disposed therein.
3. The container of claim 1 wherein said spout surfaces has a door and wings for directing flow of the animal food to the basin means.
4. The container of claim 1, wherein said feeding surface has a plurality of tension members for suspending the feeding surface; and wherein said internal rim is connected to said side walls for supporting said container body.
5. The container of claim 4, including a roof cover connected to the plurality of tension members for supporting the tension members and the feeding surface.
6. The container of claim 5, further including hook means connected to said roof cover for enabling said container body and said feeding surface and said roof cover to be supported.
7. A combined container and feeding apparatus comprising a closed container for animal food;
   openable spout means formed in said container for allowing said food to pour from said container;
   said spout means including a door surface and two side wing supporting surfaces which direct animal food urged by gravity force in a downward flow;
   basin means connected to said container for forming a support for an animal to feed thereon directly from the basin means and forming a collector for the food flowing therein;
   said door surface and wing surfaces being formed such that food for said animal may flow downwardly directly into said basin means and coacts with the basin means such that said flow will cease when the basin means is filled to a selected level;
   said basin means attached to a bottom surface of the said closed container basin means comprising a feeding surface, internal rim means formed on said feeding surface for overfitting said bottom surface and external rim means formed on said feeding surface spaced from said internal rim means.
8. A combined animal feed container and animal feeding station, comprising:
   a container having closed bottom, top and side wall surfaces;
   spout means coupled to and formed in said side wall surfaces, said spout means being pivotally mounted in said side wall surface to maintain an open position and a closed position;
   said spout means including spout surfaces for directing animal food urged by gravity force in a downward flow;
   basin means connected to said container for collecting therein said animal food which coacts with the spout means and for stopping the flow when the food reaches a selected level;
   wherein said basin means is attached to said bottom surface, said basin means comprising a feeding surface, internal rim means formed on said feeding surface for overfitting said bottom surface and external rim means formed on said feeding surface spaced from said internal rim means.

* * * * *